United States Patent
Kawanabe et al.

(10) Patent No.: US 12,015,822 B2
(45) Date of Patent: Jun. 18, 2024

(54) VIDEO SIGNAL PROCESSING DEVICE, VIDEO SIGNAL PROCESSING METHOD, RECORDING MEDIUM, AND SIGNAL PROCESSING CIRCUIT

(71) Applicant: Panasonic Intellectual Property Management Co., Ltd., Osaka (JP)

(72) Inventors: Kazuki Kawanabe, Osaka (JP); Shuji Fujiishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/799,834

(22) PCT Filed: Oct. 13, 2020

(86) PCT No.: PCT/JP2020/038655
§ 371 (c)(1),
(2) Date: Aug. 15, 2022

(87) PCT Pub. No.: WO2021/171687
PCT Pub. Date: Sep. 2, 2021

(65) Prior Publication Data
US 2023/0090807 A1 Mar. 23, 2023

(30) Foreign Application Priority Data
Feb. 26, 2020 (JP) .................. 2020-030744

(51) Int. Cl.
*H04N 21/4385* (2011.01)
*H04N 21/2343* (2011.01)

(52) U.S. Cl.
CPC ..... *H04N 21/4385* (2013.01); *H04N 21/2343* (2013.01)

(58) Field of Classification Search
CPC .................. H04N 21/4385; H04N 21/2343
See application file for complete search history.

(56) References Cited

U.S. PATENT DOCUMENTS

| | | | | |
|---|---|---|---|---|
| 6,088,737 A * | 7/2000 | Yano | ...... | G06F 9/505 709/224 |
| 7,010,714 B1 * | 3/2006 | Tester | ...... | G06F 7/68 331/2 |

(Continued)

FOREIGN PATENT DOCUMENTS

| | | |
|---|---|---|
| EP | 2757796 A1 | 7/2014 |
| EP | 3217675 A1 | 9/2017 |

(Continued)

OTHER PUBLICATIONS

International Search Report issued on Jan. 12, 2021 in International Patent Application No. PCT/JP2020/038655, with English translation.

*Primary Examiner* — Joshua D Taylor
(74) *Attorney, Agent, or Firm* — Rimon P.C.

(57) ABSTRACT

A video signal processing device includes an SoC that receives input of a plurality of video signals, each including a plurality of packets, and multiplexing the video signals to output a multiplexed video signal, and an FPGA that receives input of a multiplexed video signal and demultiplexes the multiplexed video signal to output the plurality of video signals. When deficient data whose size is less than the size of one packet is detected in any of a plurality of video signals, the FPGA performs one of (i) processing for discarding the detected deficient data and (ii) processing for adding dummy data to the detected deficient data to make the size of the deficient data equal to the size of an integral multiple of one packet.

6 Claims, 8 Drawing Sheets (56) References Cited

U.S. PATENT DOCUMENTS

| | | | |
|---|---|---|---|
| 2005/0210179 A1* | 9/2005 | Walmsley | G06F 21/445 |
| | | | 711/3 |
| 2017/0118317 A1* | 4/2017 | Hasegawa | H04J 3/06 |
| 2018/0097911 A1* | 4/2018 | Lundgren | H04L 67/1001 |

FOREIGN PATENT DOCUMENTS

| | | |
|---|---|---|
| JP | 2007-096737 A | 4/2007 |
| JP | 2017-163427 A | 9/2017 |

* cited by examiner

VIDEO SIGNAL PROCESSING DEVICE, VIDEO SIGNAL PROCESSING METHOD, RECORDING MEDIUM, AND SIGNAL PROCESSING CIRCUIT

CROSS-REFERENCE OF RELATED APPLICATIONS

This application is the U.S. National Phase under 35 U.S.C. § 371 of International Patent Application No. PCT/JP2020/038655, filed on Oct. 13, 2020, which in turn claims the benefit of Japanese Patent Application No. 2020-030744, filed on Feb. 26, 2020, the entire disclosures of which Applications are incorporated by reference herein.

TECHNICAL FIELD

The present disclosure relates to a video signal processing device and so on for processing video signals.

BACKGROUND ART

Video signal processing devices that receive European digital broadcasting use a digital video broadcasting-common interface (DVB-CI) specification for reception of pay broadcasts using video signals encrypted by processing such as scrambling. In the DVB-CI specification, a video signal processing device includes a common interface (CI) slot and decrypts encrypted video signals via a card-type conditional access module (CAM) that is connected to the CI slot by insertion (placement). The CAM connected to the CI slot decrypts a transport stream (TS) output from a tuner that selects a pay broadcast to receive video signals.

Patent Literature (PTL) 1 discloses a video signal processing device that includes a plurality of CI slots. The video signal processing device enables a user to view a plurality of types of pay broadcasts at the same time, record programs at the same time, and record a program while viewing the program.

CITATION LIST

Patent Literature

[PTL 1]
Publication of European Patent Application No. 2757796

SUMMARY OF INVENTION

Technical Problem

Because of constraints such as cost or size, a video signal processing device may include a signal processing circuit such as a system on a chip (SoC) that is poor in resources including output terminals and thus only capable of outputting video signals via a single system. In this case, the signal processing circuit uses a method of multiplexing a plurality of video signals to output a multiplexed video signal from one output terminal. Another signal processing circuit such as a field programmable gate array (FPGA) demultiplexes a received multiplexed video signal to output each of a plurality of video signals to a corresponding CI slot. In each CI slot, encrypted video signals are decrypted by a CAM inserted in the CI slot. Such a signal processing circuit that is only capable of outputting video signals via a single system may generate deficient data whose size is less than the size of one packet when changing a channel that carries any video signal out of a plurality of video signals. Although details will be described later, the other video signals on channels that are not changed may be affected by the deficient data.

The present disclosure provides a video signal processing device and so on in which, when a signal processing circuit that is only capable of outputting video signals via a single system changes a channel that carries any video signal out of a plurality of video signals, it is possible to reduce the possibility that the other video signals on channels that are not changed may be affected by the any video signal.

Solution to Problem

A video signal processing device according to the present disclosure includes a first signal processor that receives input of a plurality of video signals, each including a plurality of packets, and multiplexes the plurality of video signals to output a multiplexed video signal, and a second signal processor that receives input of the multiplexed video signal and demultiplexes the multiplexed video signal to output the plurality of video signals. When deficient data whose size is less than a size of one packet is detected in any of the plurality of video signals, the second signal processor performs one of (i) processing for discarding the deficient data detected and (ii) processing for adding dummy data to the deficient data detected to make a size of the deficient data equal to a size of an integral multiple of one packet.

A video signal processing method according to the present disclosure is a video signal processing method that is performed by a video signal processing device that includes a first signal processor and a second signal processor, the first signal processor receiving input of a plurality of video signals, each including a plurality of packets, and multiplexing the plurality of video signals to output a multiplexed video signal, and the second signal processor receiving input of the multiplexed video signal and demultiplexing the multiplexed video signal to output the plurality of video signals. The video signal processing method includes, when deficient data whose size is less than a size of one packet is detected in any of the plurality of video signals, performing one of (i) processing for discarding the deficient data detected and (ii) processing for adding dummy data to the deficient data detected to make a size of the deficient data equal to a size of an integral multiple of one packet.

A recording medium according to the present disclosure is a non-transitory computer-readable recording medium having recorded thereon a program for causing a computer to execute the video signal processing method described above A signal processing circuit according to the present disclosure is configured to receive input of a plurality of video signals, each including a plurality of packets, and multiplex the plurality of video signals to output a multiplexed video signal, and transmit a notification for starting detection processing for detecting deficient data whose size is less than a size of one packet.

A signal processing circuit according to the present disclosure is configured to receive input of a multiplexed video signal obtained by multiplexing a plurality of video signals, each including a plurality of packets, and demultiplex the multiplexed video signal to output the plurality of video signals, start detection processing for detecting deficient data whose size is less than a size of one packet when receiving a notification for starting the detection processing, and when the deficient data is detected in any of the plurality of video signals, perform one of (i) processing for discarding the deficient data detected and (ii) processing for adding dummy data to the deficient data detected to make a size of the deficient data equal to a size of an integral multiple of one packet.

Advantageous Effects of Invention

With the video signal processing device and so on according to the present disclosure, when a signal processing circuit that is only capable of outputting video signals via a single system changes a channel that carries any video signal out of a plurality of video signals, it is possible to reduce the possibility that the other video signals on channels that are not changed may be affected by the any video signal.

DESCRIPTION OF EMBODIMENTS

Hereinafter, an embodiment will be described in detail with reference to the drawings as appropriate. However, detailed descriptions more than necessary may be omitted. For example, detailed descriptions of well-known matter and redundant description of substantially identical constituent elements may be omitted. This is to avoid unnecessary redundancy of the following description and to facilitate understanding for persons skilled in the art.

The inventors provide the accompanying drawings and the following description to help those skilled in the art to better understand the present disclosure, and do not intend to limit the subject matter of claims by the drawings and the description.

Embodiment

Hereinafter, one embodiment will be described with reference to FIGS. 1 to 5.

Figure 1:
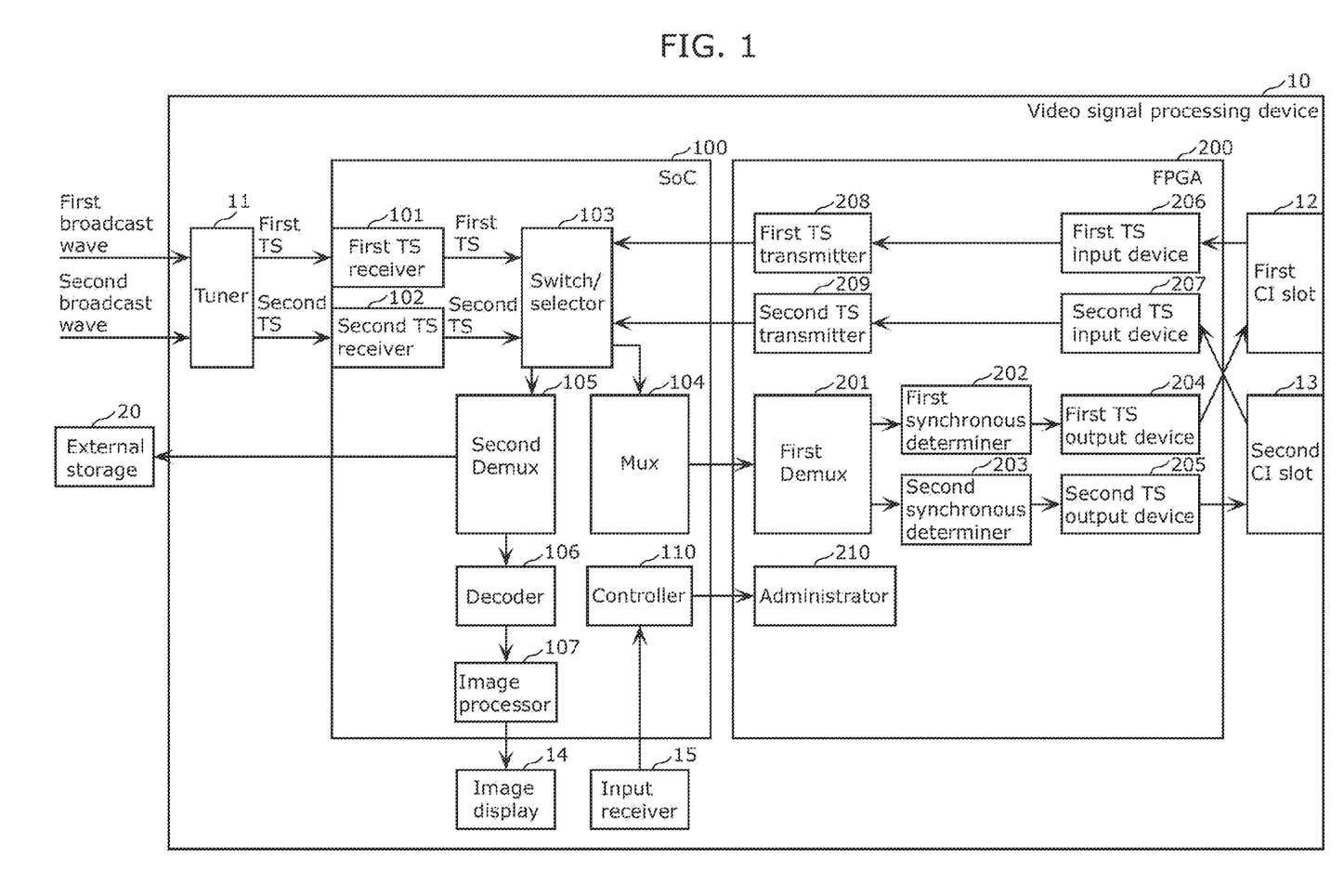
FIG. 1 is a diagram showing one example of a configuration of a video signal processing device according to an embodiment.

FIG. 1 is a diagram showing one example of a configuration of video signal processing device 10 according to the embodiment. FIG. 1 also illustrates external storage 20, in addition to video signal processing device 10. For example, external storage 20 may include a recording medium such as a memory or a hard disk, record data about video signals (content data) transmitted from video signal processing device 10 on the recording medium, and in accordance with a user operation or any other operation, transmit signals for reproducing contents from recorded data to a display device that includes, for example, a liquid crystal display, a plasma display, or an organic electroluminescent (EL) display.

Video signal processing device 10 may include, for example, an SoC that includes a processor and other constituent elements, an FPGA, a memory, a broadcast receiving circuit (tuner), a communication interface, and a user interface. The communication interface may, for example, be a communication circuit for transmitting and receiving information to and from other devices. The memory may, for example, be a ROM or a RAM. The memory previously stores programs for realizing processing of each constituent element described later or set values used in such programs. The memory is also used to temporarily store values that are used to execute programs. Video signal processing device 10 is compliant with specifications such as DVB-CI and DVB-CI Plus, includes CI slots, and decrypts encrypted video signals regarding pay broadcasts received via, for example, an antenna or a cable (not shown) from a receiver (e.g., a tuner and a communication interface), using CAMs connected to the CI slots by insertion (placement). The video signals received by video signal processing device 10 are digital broadcasting signals formed by, for example, modulating a TS and may, for example, be signals broadcasted (transmitted) according to one of various broadcasting standards such as terrestrial broadcasting, broadcast satellite (BS) broadcasting, communication satellite (CS) broadcasting, Internet broadcasting, or a cable television. In the digital broadcasting, broadcasting contents (contents) are multiplexed and transmitted in the form of a TS compliant with the MPEG2 system standards. Video signal processing device 10 receives broadcasting signals and outputs signals regarding the contents in accordance with, for example, a user operation of selecting a channel. The signals regarding the contents, which are output from video signal processing device 10, are transmitted to a display device (not shown) and external storage 20 such as a video reproducer via a cable or any other means (not shown). Accordingly, a user is able to, for example, view the contents displayed on the display device or record the contents on external storage 20.

Video signal processing device 10 includes tuner 11, first CI slot 12, second CI slot 13, image display 14, input receiver 15, SoC 100, and FPGA 200.

Tuner 11 receives a broadcast wave via, for example, an antenna and a cable and outputs a TS extracted from the broadcast wave on a channel selected in accordance with, for example, a user operation. The TS is one example of video signals each including a plurality of packets. For example, tuner 11 may obtain a TS by tuning and demodulating broadcasting signals regarding a broadcast wave of digital broadcasting received via the antenna according to a predetermined broadcasting standard and output the TS to SoC 100. The predetermined broadcasting standard as used herein refers to, for example, a digital video broadcasting-terrestrial (DVB-T) standard, a digital video broadcasting-second generation terrestrial (DVB-T2) standard, a digital video broadcasting-cable (DVB-C) standard, a digital video broadcasting-satellite (DVB-S) standard, or a digital video broadcasting satellite-second generation (DVB-S2) standard. For example, tuner 11 may obtain a TS by receiving broadcasting signals transmitted via network such as the Internet according to a predetermined communication protocol and output the TS to SoC 100. Tuner 11 is capable of receiving different broadcast waves transmitted from, for example, two different broadcast stations at the same time, and is capable of processing two TSs in parallel. For example, tuner 11 may receive a first broadcast wave and output a first TS and may receive a second broadcast wave and output a second TS.

First CI slot 12 inputs the first TS output from FPGA 200 to a CAM inserted therein (connected thereto). Second CI slot 13 inputs the second TS output from FPGA 200 to a CAM inserted therein (connected thereto). Each CAM includes a decryption circuit and decrypts a received TS to output a decrypted TS. For example, first CI slot 12 receives input of the encrypted first TS and outputs the first TS decrypted by the CAM to FPGA 200, and second CI slot 13 receives input of the encrypted second TS and outputs the second TS decrypted by the CAM to FPGA 200. A TS of a pay broadcast that can be decrypted by the CAM inserted in each CI slot is not necessarily always the same. For example, one CAM may be capable of decrypting broadcasting signals received from broadcast station A, and the other CAM may be incapable of decrypting broadcasting signals received from broadcast station A but capable of decrypting broadcasting signals received from broadcast station B. Although broadcast stations are used in the example, the capability of decryption does not necessarily have to be determined in the unit of broadcast stations. In the case where video signal processing device 10 is compliant with DVB-CI Plus Ver2, first CI slot 12 and second CI slot 13 may be interfaces corresponding to universal serial bus (USB) devices.

Image display 14 outputs contents that are output from SoC 100 to an external display device located outside video signal processing device 10.

Input receiver 15 may include, for example, a device for receiving signals such as infrared-ray remote control signals, receive signals regarding user operations such as selecting broadcasting to be received (selecting a channel) in response to, for example, a press on a button of a remote controller, and output the received signals to SoC 100. Input receiver 15 may have a function of accepting a user operation, such as selecting broadcasting to be received (selecting a channel), via a user interface including a button or a switch provided on the casing of video signal processing device 10 and outputting received signals to SoC 100. The user interface may be a graphical user interface (GUI) using a display.

SoC 100 is one example of a first signal processor (also referred to as a "signal processing circuit") that receives input of a plurality of TSs (in the present example, the first TS and the second TS), each including a plurality of packets, and multiplexes the first TS and the second TS to output a multiplexed TS. SoC 100 may, for example, be a signal processing circuit that outputs TSs only via a single system (in other words, that is only capable of outputting TSs via a signal system) due to constraints such as cost or size. For example, SoC 100 may include only one output terminal that is capable of outputting TSs. Alternatively, for example in the case where SoC 100 requires a large number of output terminals for various applications, SoC 100 may include a plurality of output terminals capable of outputting TSs and may have only one output terminal capable of outputting TSs to the CI slots. SoC 100 includes first TS receiver 101, second TS receiver 102, switch/selector 103, multiplexer (referred to as "Mux") 104, second demultiplexer (referred to as "Demux") 105, decoder 106, image processor 107, and controller 110.

First TS receiver 101 receives the first TS that is output from tuner 11 and outputs the first TS to switch/selector 103. Second TS receiver 102 receives the second TS that is output from tuner 11 and outputs the second TS to switch/selector 103.

Switch/selector 103 selectively outputs TSs that are output from first TS receiver 101 and second TS receiver 102 to Mux 104 and second Demux 105, respectively. Switch/selector 103 also outputs TSs that are output from FPGA 200 to second Demux 105. In the case where a broadcast wave received by tuner 11 is a broadcast wave of a pay broadcast, a TS is encrypted and output to Mux 104. A TS that is not encrypted is output to second Demux 105. For example, in the case where a TS that is not encrypted is a TS for viewing, the TS is output to image display 14 via second Demux 105. In the case where a TS that is not encrypted is a TS for recording, the TS is output to external storage 20 via second Demux 105.

Mux 104 multiplexes the first TS and the second TS that are output from switch/selector 103 and outputs a multiplexed TS to FPGA 200. As described above, since SoC 100 is a signal processing circuit that is poor in resources including output terminals and thus only capable of outputting video signals via a single system, the first TS and the second TS are once multiplexed in SoC 100 and a resultant multiplexed TS is demultiplexed on, for example, an external chip of FPGA 200 and divided into the first TS and the second TS. When multiplexing the first TS and the second TS, for example, Mux 104 sets the value of a sync byte to be inserted at the beginning of each of a plurality of packets in the first TS to 0x47, and sets the value of a sync byte to be inserted at the beginning of each of a plurality of packets in the second TS to 0x48. This is a multiplexing method prescribed by the CI Plus standards.

In the case where a TS that is output from switch/selector 103 is a TS for viewing, second Demux 105 demultiplexes and divides data multiplexed in the TS, such as video, sound, subtitle, or a program schedule, and outputs the demultiplexed data to decoder 106. In the case where a TS that is output from switch/selector 103 is a TS for recording, second Demux 105 deletes unnecessary data included in the TS, encrypts the TS, and outputs the encrypted TS to external storage 20.

The TS for viewing that is output from second Demux 105 is decoded by decoder 106, subjected to image processing in image processor 107, and output as contents to image display 14.

Controller 110 is realized by, for example, the processor of SoC 100 executing a program stored in the memory. Controller 110 controls each constituent element of SoC 100 or controls FPGA 200 in accordance with, for example, a user operation received via input receiver 15. Details of the operations of controller 110 will be described later.

FPGA 200 is one example of a second signal processor (also referred to as a "signal processing circuit") that receives input of a multiplexed TS and demultiplexes the multiplexed TS to output a plurality of TSs (in the present example, the first TS and the second TS). FPGA 200 is a signal processing circuit provided separately from SoC 100 in video signal processing device 10. FPGA 200 includes first Demux 201, first synchronous determiner 202, second synchronous determiner 203, first TS output device 204, second TS output device 205, first TS input device 206, second TS input device 207, first TS transmitter 208, second TS transmitter 209, and administrator 210.

First Demux 201 demultiplexes a multiplexed TS that is output from SoC 100 into the first TS and the second TS according to sync bytes, converts each sync byte into 0x47, and then outputs the first TS to first synchronous determiner 202 and the second TS to second synchronous determiner 203.

First synchronous determiner 202 detects whether the received first TS is in units of 188-byte packets prescribed by the MPEG2 system standards, and if the first TS is in units of 188-byte packets, outputs the first TS to first TS output device 204.

Second synchronous determiner 203 detects whether the received second TS is in units of 188-byte packets prescribed by the MPEG2 system standards, and if the second TS is in units of 188-byte packets, outputs the second TS to second TS output device 205.

First TS output device 204 outputs the first TS that is output from first synchronous determiner 202 to first CI slot 12 so that the encrypted first TS is decrypted by the CAM inserted in first CI slot 12.

Second TS output device 205 outputs the second TS that is output from second synchronous determiner 203 to second CI slot 13 so that the encrypted second TS is decrypted by the CAM inserted in second CI slot 13.

In the case where video signal processing device 10 is compliant with DVB-CI Plus, each TS is encrypted again by the CAM inserted in each CI slot. The TSs encrypted by the CAMs are decrypted by second Demux 105.

First TS input device 206 receives input of the first TS decrypted by the CAM inserted in first CI slot 12 and outputs the first TS to first TS transmitter 208.

Second TS input device 207 receives input of the second TS decrypted by the CAM inserted in second CI slot 13 and outputs the second TS to second TS transmitter 209.

First TS transmitter 208 outputs the first TS that is output from first TS input device 206 to SoC 100.

Second TS transmitter 209 outputs the second TS that is output from second TS input device 207 to SoC 100.

Administrator 210 controls each constituent element of FPGA 200 in accordance with instructions received from controller 110 of SoC 100. For example, in accordance with instructions received from controller 110 of SoC 100, administrator 210 manages the CI slot to which a TS corresponding to each sync byte is output, i.e., whether a TS corresponding to each sync byte is passed through a route from first Demux 201 to first TS output device 204 or through a route from first Demux 201 to second TS output device 205. Details of the operations of administrator 210 will be described later.

In the case where the channel that carries either of the first TS and the second TS is changed, the TS on the changed channel may have deficient data whose size is less than the size of one packet. Here, the principle behind the generation of deficient data and a problem caused by the generation of deficient data will be described with reference to FIGS. 2A to 2D.

FIGS. 2A to 2D are diagrams for describing the principle behind the generation of deficient data and the problem caused by the generation of deficient data. FIGS. 2A to 2D illustrate only Mux 104 among the constituent elements of SoC 100 and only first Demux 201 among the constituent element of FPGA 200.

Figure 2A:
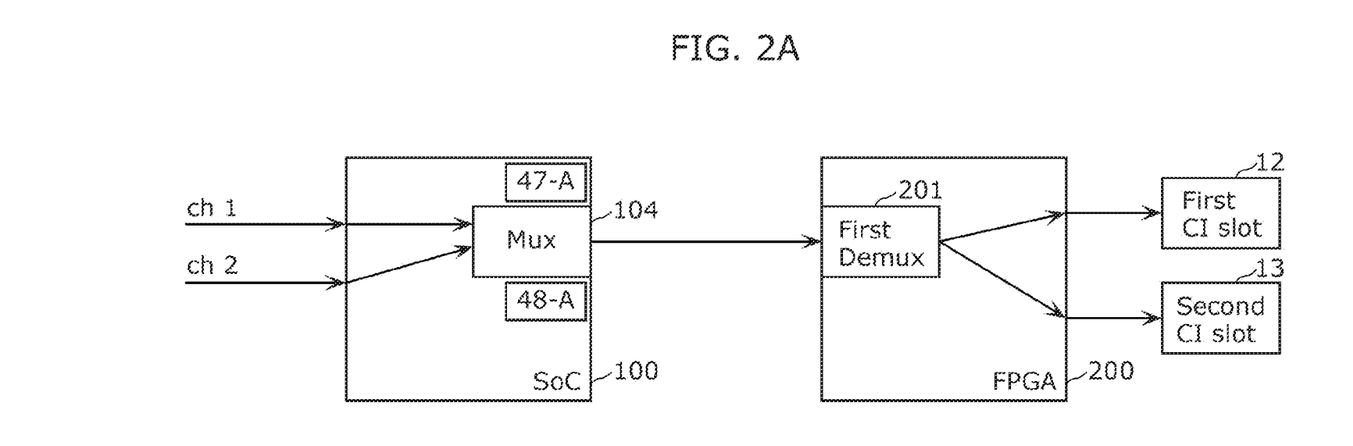
FIG. 2A is a diagram for describing a principle behind generation of deficient data and a problem caused by the generation of deficient data.
Figure 2B:
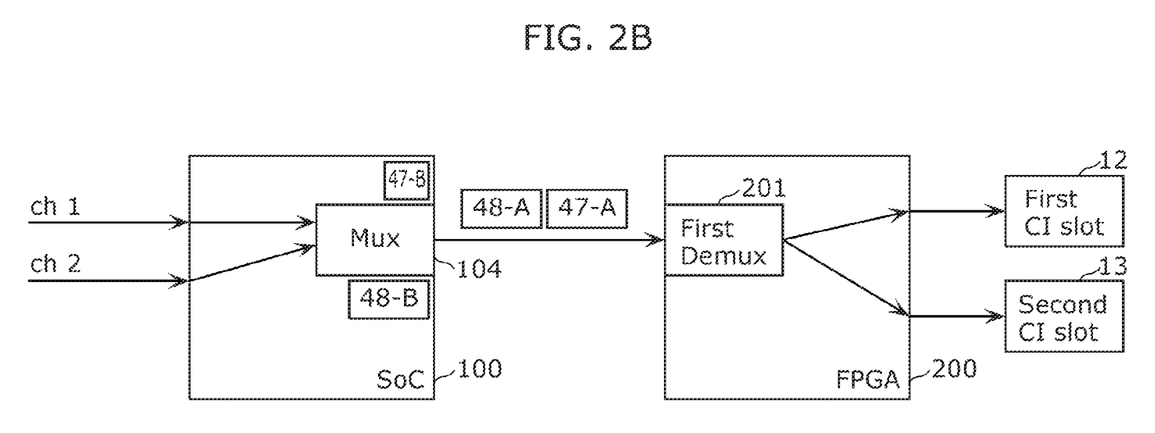
FIG. 2B is a diagram for describing the principle behind the generation of deficient data and the problem caused by the generation of deficient data.
Figure 2C:
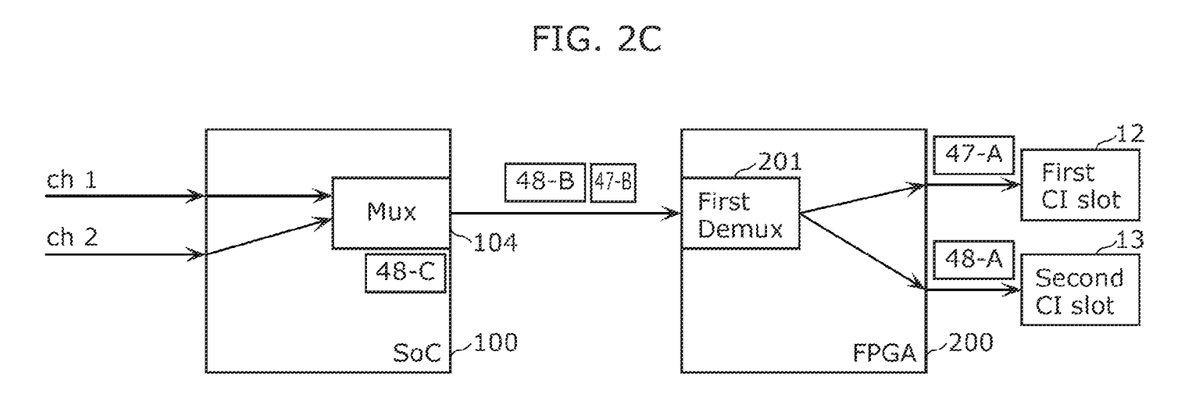
FIG. 2C is a diagram for describing the principle behind the generation of deficient data and the problem caused by the generation of deficient data.
Figure 2D:
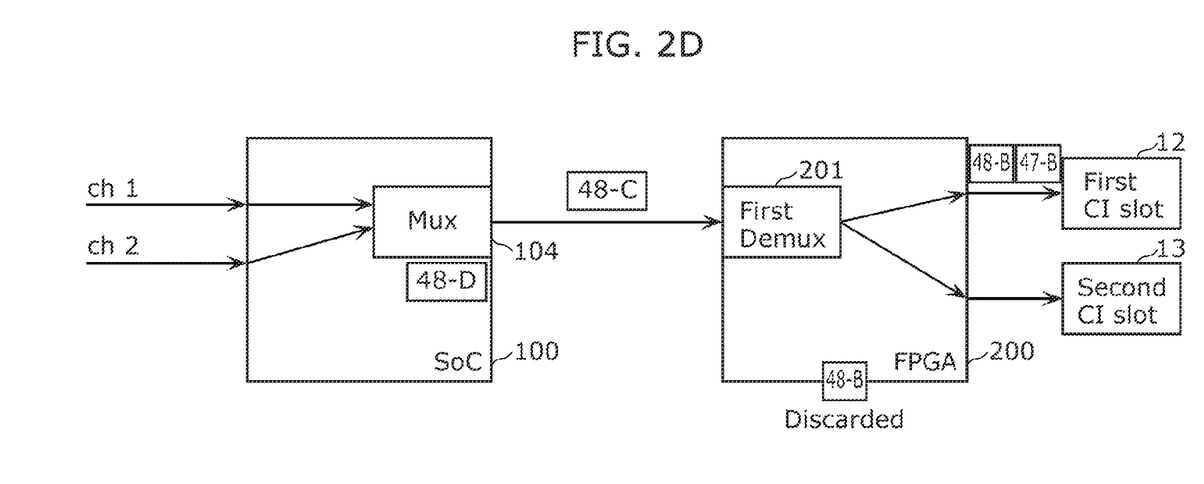
FIG. 2D is a diagram for describing the principle behind the generation of deficient data and the problem caused by the generation of deficient data.

As illustrated in FIG. 2A, for example, SoC 100 receives a TS on channel 1 (labelled "ch1") as the first TS and a TS on channel 2 (labeled "ch2") as the second TS and multiplexes the TSs in Mux 104. For example, sync bytes in the first TS on ch1 after multiplexed by Mux 104 are assumed to be 0x47, and sync bytes in the second TS on ch2 after multiplexed are assumed to be 0x48. A plurality of packets included in the first TS after multiplexed by Mux 104 is expressed as "47-A", and a plurality of packets included in the second TS after multiplexed is expressed as "48-A". The values "47" and "48" schematically represent 0x47 and 0x48, which are the values of the sync bytes. In FIGS. 2B to 2D, packets are denoted as "47-B", "48-B", and so on, and a sequence of packets in each TS is presented in alphabetical order such as "A", "B", "C", and so on.

As illustrated in FIG. 2B, in the present example, packet "47-A" in the first TS and packet "48-A" in the second TS are first multiplexed. At this time, a case is conceivable in which the channel carrying the first TS is changed, and in SoC 100, a packet (e.g. packet "47-B") that follows packet "47-A" in the first TS breaks in midstream due to the channel change and becomes a fractional packet whose size is less than the size of one packet (e.g., 188 bytes) as illustrated in FIG. 2B.

In this case, the fractional packet of packet "47-B" in the first TS and packet "48-B" in the second TS are multiplexed as illustrated in FIG. 2C. Packet "47-A" in the first TS and packet "48-A" in the second TS are demultiplexed by first Demux 201 and divided according to the sync byte of each packet. Then, packet "47-A" is output to first CI slot 12, and packet "48-A" is output to second CI slot 13. Although First Demux 201 converts the sync byte of each packet into 0x47, the packet in the second TS is still denoted as "48-*" in order to distinguish this packet in the second TS, demultiplexed and divided by first Demux 201, from the packet in the first TS.

Then, as illustrated in FIG. 2D, first Demux 201 interprets one packet's worth of data (e.g., 188 bytes) from the first byte of packet "47-B" (i.e., the sync byte of this packet) as one packet and outputs the fractional packet of packet "47-B" and some first bytes of following packet "48-B" as one packet to first CI slot 12. Remaining packet "48-B" from which some first bytes are cut has no sync byte because the cut first bytes include the sync byte. Thus, FPGA 200 is incapable of determining whether remaining packet "48-B" is the packet to be output to first CI slot 12 or the packet to be output to second CI slot 13, and therefore discards remaining packet "48-B". In this way, the generation of deficient data in the first TS results in a loss of some packets in the second TS and affects the second TS on the channel that is not changed. This may consequently cause, for example, noise to be displayed on the screen of the display device.

Figure 3:
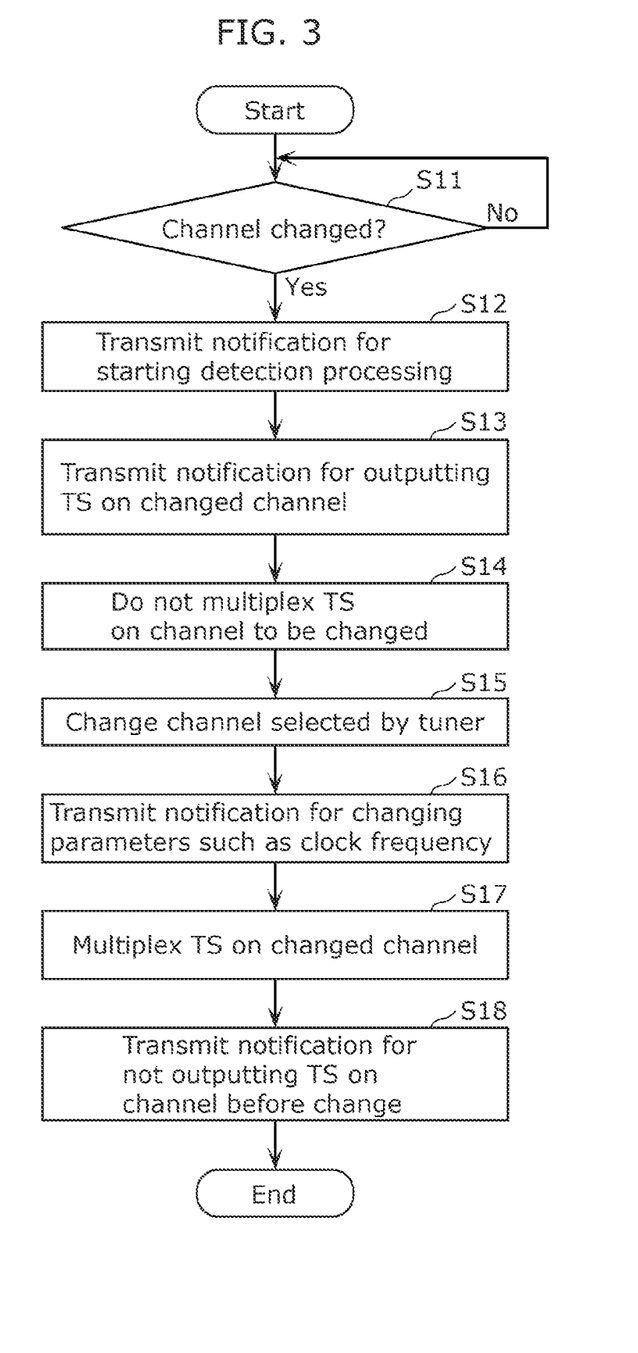
FIG. 3 is a flowchart showing one example of operations of an SoC according to the embodiment.
Figure 4:
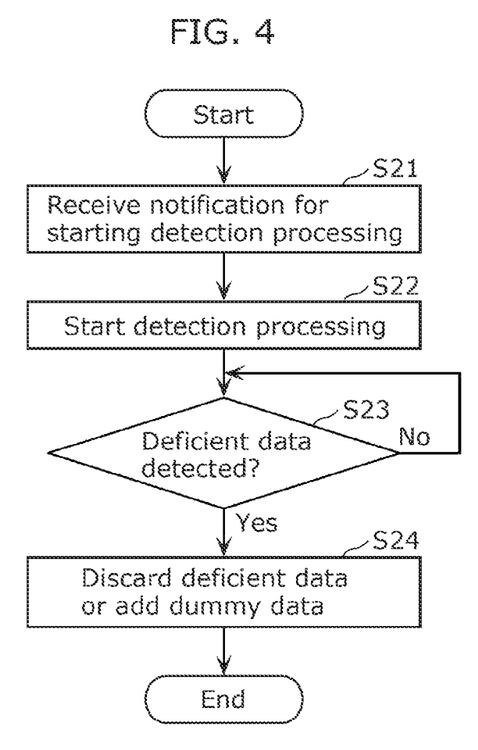
FIG. 4 is a flowchart showing one example of operations of an FPGA according to the embodiment.

In view of this, SoC 100 and FPGA 200 perform processing described in FIGS. 3 and 4 so as to reduce the possibility that, when a channel that carries any TS out of the first TS and the second TS is changed, the other TS on the channel that is not changed may be affected by the any TS.

FIG. 3 is a flowchart showing one example of the operations of SoC 100 (specifically, controller 110) according to the embodiment.

SoC 100 determines whether a channel that carries either of the first TS and the second TS has been changed (step S11). For example, SoC 100 makes this determination by receiving a signal regarding a user operation such as selecting broadcasting to be received (selecting a channel) with a press on a button of a remote controller or by any other means via input receiver 15.

When it is determined that a channel that carries either of the first TS and the second TS has not been changed (No in step S11), SoC 100 repeats the processing in step S11 until the channel is changed.

When it is determined that a channel that carries either of the first TS and the second TS has been changed (Yes in step S11), SoC 100 transmits, to FPGA 200, a notification for starting detection processing for detecting deficient data whose size is less than the size of one packet (step S12). Specifically, when changing a channel that carries video signals in either of the first TS and the second TS, SoC 100 transmits a notification for starting the detection processing to FPGA 200. For example, when it is determined that the channel carrying the first TS has been changed, a notification for starting detection processing for the first TS is transmitted, and when it is determined that the channel carrying the second TS has been changed, a notification for starting detection processing for the second TS is transmitted.

Next, SoC 100 transmits a notification for outputting a TS on the changed channel, to FPGA 200 (step S13). Upon receipt of this notification, for example when the channel carrying the first TS has been changed, FPGA 200 outputs the TS on the changed channel to first CI slot 12 that serves as an output destination of the first TS, and for example, when the channel carrying the second TS has been changed, FPGA 200 outputs the TS on the changed channel to second CI slot 13 that serves as an output destination of the second TS.

Next, SoC 100 prevents multiplexing of the TS on the channel to be changed (step S14). In other words, SoC 100 prevents the TS on the channel to be changed from being output to FPGA 200. For example, when the channel carrying the first TS has been changed, SoC 100 controls switch/selector 103 so as not to output the first TS on the channel before change to Mux 104. For example, when the channel carrying the second TS has been changed, SoC 100 controls switch/selector 103 so as not to output the second TS on the channel before change to Mux 104.

Next, SoC 100 changes the channel selected by tuner 11 (step S15). For example, when the channel carrying the first TS has been changed, SoC 100 controls tuner 11 so as to select the changed channel, instead of the current channel carrying the first TS, and output the TS on the changed channel. For example, when the channel carrying the second TS has been changed, SoC 100 controls tuner 11 so as to select the changed channel, instead of the current channel carrying the second TS, and output the TS on the changed channel.

Next, SoC 100 transmits, to FPGA 200, a notification for changing parameters such as clock frequency that are output to the CI slot, which serves as the output destination of the TS on the changed channel, into parameters corresponding to the changed channel (step S16). For example, when the channel carrying the first TS has been changed, SoC 100 transmits a notification for changing parameters that are output to first CI slot 12, which serves as the output destination of the first TS, into parameters corresponding to the changed channel. For example, when the channel carrying the second TS has been changed, SoC 100 transmits a notification for changing parameters that are output to second CI slot 13, which serves as the output destination of the second TS, into parameters corresponding to the changed channel.

Next, SoC 100 multiplexes the TS on the changed channel (step S17). In other words, SoC 100 outputs the TS on the changed channel to FPGA 200. For example, SoC 100 controls switch/selector 103 so as to output the TS on the changed channel to Mux 104.

Then, SoC 100 transmits, to FPGA 200, a notification for not outputting the TS on the channel before change (step S18). Upon receipt of this notification, for example when the channel carrying the first TS has been changed, FPGA 200 prevents the first TS from being output to first CI slot 12, and for example when the channel carrying the second TS has been changed, FPGA 200 prevents the second TS from being output to second CI slot 13. Accordingly, FPGA 200 is capable of outputting the TS on the changed channel without concern for the TS on the channel before change.

The sequence of processing executed by SoC 100 is not limited to the example illustrated in FIG. 3. For example, there are no particular limitations on the sequence of execution of the processing in step S18 as long as step S18 is performed after step S14. For example, the sequence of the processing in step S15 and the processing in step S16 may be switched.

Next, the operations of FPGA 200 will be described with reference to FIG. 4.

FIG. 4 is a flowchart showing one example of the operations of FPGA 200 (specifically, administrator 210) according to the embodiment.

First, FPGA 200 receives, from SoC 100, a notification for starting detection processing for detecting deficient data whose size is less than the size of one packet (specifically, the notification transmitted in step S12 illustrated in FIG. 3) (step S21).

Upon receipt of this notification, FPGA 200 starts the detection processing (step S22). For example, when it is determined that the channel carrying the first TS has been changed in SoC 100, FPGA 200 starts to perform the detection processing on the first TS. For example, when it is determined that the channel carrying the second TS has been changed in SoC 100, FPGA 200 starts to perform the detection processing on the second TS.

Next, FPGA 200 determines whether deficient data has been detected in either of the first TS and the second TS (step S23). For example, FPGA 200 detects deficient data by referencing the number of bytes existing between the previous sync byte and the sync byte detected at the beginning of the packet and determining whether the number of bytes is equal to 188 bytes. For example, when this number of bytes is equal to 188 bytes, FPGA 200 determines that deficient data has not been detected, and when this number of bytes is not equal to 188 bytes, FPGA 200 determines that deficient data has been detected.

When no deficient data has been detected in either of the first TS and the second TS (No in step S23), FPGA 200 repeats the processing in step S23 until deficient data is detected. It is, however, noted that in some cases, adventitiously no deficient data may be generated when the channel is changed. Thus, for example, FPGA 200 may end the processing in FIG. 4 in cases such as where the TS on the changed channel has been received without detecting deficient data or where a predetermined period of time has elapsed since the start of the processing in step S23.

When deficient data is detected in either of the first TS and the second TS (Yes in step S23), FPGA 200 performs one of processing for discarding the detected deficient data and processing for adding dummy data to the detected deficient data so as to make the size of the deficient data equal to the size of an integral multiple of one packet (step S24). The processing for making the size of the deficient data equal to the size of an integral multiple of one packet refers to processing for adding dummy data to the end of the deficient data so that the packet obtained by combining the deficient data and the dummy data has a total size corresponding to the size of an integral multiple of 188 bytes (e.g., 188 bytes, 376 bytes, or 564 bytes). By discarding the detected deficient data or by adding dummy data to the detected deficient data, it is possible to reduce the possibility that the deficient data in the TS on the changed channel and some first bytes of the following packet in the other TS on the channel that is not changed are handled as one packet. This reduces a loss of some first bytes of the following packet in the other TS.

Figure 5:
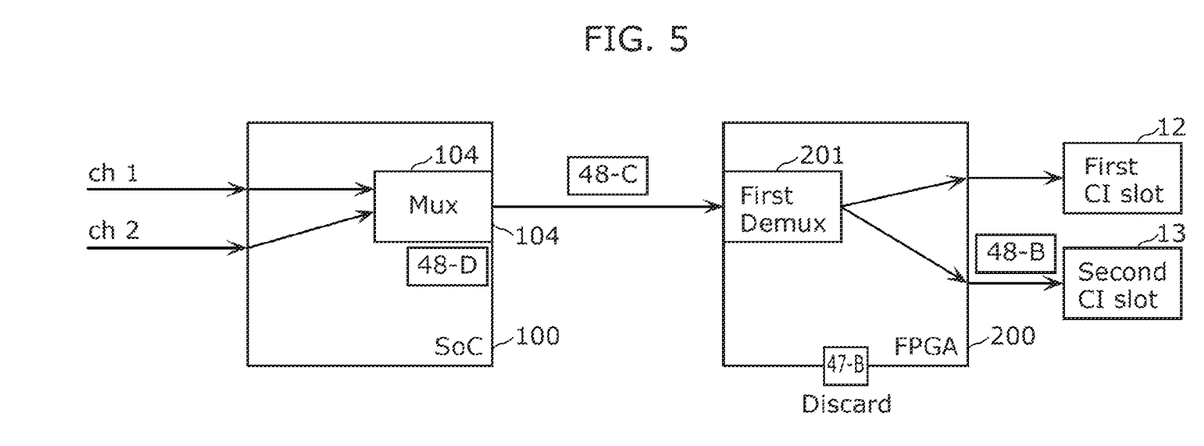
FIG. 5 is a diagram for describing how the problem caused by the generation of deficient data is solved.

FIG. 5 is a diagram for describing how the problem caused by the generation of deficient data is solved. FIG. 5 illustrates a condition after FPGA 200 has performed the detection processing for detecting deficient data in FIG. 2C. That is, when FPGA 200 has performed the detection processing for detecting deficient data, the condition in FIG. 2C transitions to the condition in FIG. 5, instead of the condition in FIG. 2D. FIG. 5 shows an example in which deficient data generated is discarded.

As illustrated in FIG. 5, as a result of discarding the deficient data, i.e., packet "47-B", it is possible to prevent some first bytes of following packet "48-B" from being cut and to properly output packet "48-B" to second CI slot 13. When dummy data is added to the deficient data, it is possible to output packet "47-B" with dummy data added thereto to first CI slot 12 and to properly output packet "48-B" to second CI slot 13.

Although the example has been described in which FPGA 200 starts the detection processing when receiving a notification for the detection processing, the present disclosure is not limited to this example. For example, FPGA 200 may perform the detection processing all the time. This reduces the need for SoC 100 to transmit a notification for starting the detection processing, but loads on FPGA 200 will increase. Meanwhile, in the case where a notification for starting the detection processing is transmitted from SoC 100 to FPGA 200, FPGA 200 is capable of performing the detection processing as necessary. This reduces loads on FPGA 200.

Although the example has been described in which video signal processing device 10 handles two TSs (here, the first TS and the second TS) as a plurality of video signals, the present disclosure is not limited to this example. For example, video signal processing device 10 may handle three or more TSs as a plurality of video signals and may include three or more CI slots.

Advantageous Effects

As described above, video signal processing device 10 includes the first signal processor (e.g., SoC 100) that receives input of a plurality of video signals, each including a plurality of packets, and multiplexes the video signals to output a multiplexed video signal, and the second signal processor (e.g., FPGA 200) that receives input of the multiplexed video signal and demultiplexes the multiplexed video signal to output the plurality of video signals. In the case where deficient data whose size is less than the size of one packet is detected in any of a plurality of video signals, the second signal processor performs one of (i) processing for discarding the detected deficient data and (ii) processing for adding dummy data to the detected deficient data so as to make the size of the deficient data equal to the size of an integral multiple of one packet.

In this way, in the case where deficient data is generated in any video signal on the changed channel, the second signal processor either discards the deficient data or makes the size of the deficient data equal to the size of an integral multiple of one packet. This reduces the possibility that some first bytes of a packet in the video signal on the channel that is not changed may be cut and handled together with the deficient data as one packet. Accordingly, in the case where the signal processing circuit (e.g., first signal processor) that outputs video signals only via a single system changes a channel that carries any video signal out of a plurality of video signals, it is possible to reduce the possibility that the other video signals on the channel that is not changed may be affected by the any video signal.

For example, the first signal processor may transmit a notification for starting detection processing for detecting deficient data, to the second signal processor. The second signal processor may start the detection processing when receiving this notification.

In this case, the second signal processor is capable of using the notification transmitted from the first signal processor as a trigger for start of the detection processing.

For example, when changing a channel that carries any of a plurality of video signals, the first signal processor may transmit a notification for starting the detection processing, to the second signal processor.

In this case, the second signal processor is capable of starting the detection processing when the channel that carries any of a plurality of video signals is changed.

For example, when changing a channel that carries any of a plurality of video signals, the first signal processor may perform control so as to prevent multiplexing of the video signals on the channel to be changed.

In this case, it is possible to prevent the video signals on the changed channel from being multiplexed and output to the second signal processor.

The signal processing circuit (e.g., SoC 100) receives input of a plurality of video signals, each including a plurality of packets, multiplexes the video signals to output a multiplexed video signal, and transmits a notification for starting detection processing for detecting deficient data whose size is less than the size of one packet.

Accordingly, the signal processing circuit (e.g., SoC 100) allows another signal processing circuit (e.g., FPGA 200) to start detection processing for detecting deficient data. This reduces the possibility that, when the signal processing circuit that outputs video signals only via a single system changes a channel that carries any video signal out of a plurality of video signals, the other video signals on the channel that is not changed may be affected by the any video signal.

The signal processing circuit (e.g., FPGA 200) receives input of a multiplexed video signal obtained by multiplexing a plurality of video signals, each including a plurality of packets, demultiplexes the multiplexed video signal to output the plurality of video signals, starts detection processing for detecting deficient data whose size is less than the size of one packet when receiving a notification for starting the detection processing, and when deficient data is detected in any of the video signals, performs one of (i) processing for discarding the detected deficient data and (ii) processing for adding dummy data to the detected deficient data so as to make the size of the deficient data equal to the size of an integral multiple of one packet.

This allows the signal processing circuit (e.g., FPGA 200) to start the detection processing for detecting deficient data when receiving a notification for starting detection processing for detecting deficient data from another signal processing circuit (e.g., SoC 100). Accordingly, it is possible to reduce the possibility that, when the other signal processing circuit that outputs video signals only via a single system changes a channel that carries any video signal out of a plurality of video signals, the other video signals on the channel that is not changed may be affected by the any video signal.

Other Embodiments

As described above, one embodiment has been described by way of example of the technique disclosed in the present application. The technique of the present disclosure is, however, not limited to this embodiment and is also applicable to other embodiments obtained by appropriate modifications, replacements, addition, and omission. New embodiments may also be derived from any combination of constituent elements described above in the embodiment.

For example, the above-described embodiment has given the example in which each of a plurality of packets included in video signals has a fixed length of 188 bytes, but the size of one packet may be a variable length. In this case, for example, the header of each packet may describe the number of bytes up to the next sync byte, and whether deficient data is generated may be determined by determining whether the number of bytes existing between sync bytes matches the number of bytes described in the header of the packet.

For example, the example of changing a channel of a broadcast wave is given in the above-described embodiment, but the present disclosure is also applicable to the case of changing a channel of broadcasting such as the Internet.

The present disclosure may be realized not only as video signal processing device 10 but also as a video signal processing method that includes steps (processing) performed by the constituent elements of video signal processing device 10.

Specifically, the video signal processing method may be performed by video signal processing device 10 that includes a first signal processor and a second signal processor, the first signal processor receiving input of a plurality of video signals, each including a plurality of packets, and multiplexing the video signals to output a multiplexed video signal, and the second signal processor receiving input of the multiplexed video signal and demultiplexing the multiplexed video signal to output the plurality of video signals. The video signal processing method includes, when deficient data whose size is less than the size of one packet is detected in any of a plurality of video signals, performing one of (i) processing for discarding the detected deficient data and (ii) processing for adding dummy data to the detected deficient data to make the size of the deficient data equal to the size of an integral multiple of one packet.

For example, the video signal processing method may be executed by a computer (computer system). The present disclosure may also be realized as a program for causing a computer to execute the steps included in the video signal processing method. The present disclosure may also be realized as a non-transitory computer-readable recording medium such as a CD-ROM that stores the aforementioned program.

For example, in the case where the present disclosure is realized as a program (software), each step may be executed by executing a program using hardware resources such as a CPU, a memory, and an input/output circuit of a computer. That is, each step may be executed by the CPU acquiring data from, for example, the memory or the input/output circuit, computing the data, and outputting the result of computation to, for example, the memory or the input/output circuit.

The constituent elements of video signal processing device 10 according to the above-described embodiment may be realized in the form of large scale integration (LSI) serving as integrated circuits (ICs).

The integrated circuits are not limited to LSI, and may be realized as dedicated circuits or general-purpose processors. It is possible to use a programmable FPGA or a reconfigurable processor capable of reconfiguring connection and settings of circuit cells inside LSI.

Moreover, if other circuit integration techniques that replace LSI make their debuts with the advance of semiconductor technology or with derivation from another technology, such techniques may be used to integrate the constituent elements of video signal processing device 10 into an integrated circuit.

As described above, one embodiment has been described by way of example of the technique disclosed in the present disclosure. Attached drawings and detailed descriptions are provided to describe the embodiment.

Accordingly, the constituent elements illustrated in the attached drawings and described in the detailed descriptions may include not only essential constituent elements necessary to solve the problem, but also constituent elements that are not essential to solve the problem, in order to illustrate the above-described implementations. Therefore, such unessential constituent elements illustrated in the attached drawings and described in the detailed descriptions should not immediately be regarded as essential constituent elements.

The above-described embodiment is merely an illustrative example of the technique according to the present disclosure, and therefore, various modifications, replacement, addition, and omission are possible within the scope of claims or within the equivalent range of the claims.

INDUSTRIAL APPLICABILITY

The present disclosure is applicable to a video imaging device such as a television.

The invention claimed is:

1. A video signal processing device comprising:
a first signal processor that receives input of a plurality of video signals, each including a plurality of packets, and multiplexes the plurality of video signals to output a multiplexed video signal via a single output system; and
a second signal processor that receives input of the multiplexed video signal and demultiplexes the multiplexed video signal to output the plurality of video signals, wherein:
changing, by an instruction from a user of the video signal processing device via an input receiver, a channel that carries any video signal out of the plurality of video signals and is to be used as the input of the first signal processor, causes the first signal processor to transmit a notification for starting detection processing for detecting deficient data whose size is less than a size of one packet with respect to the video signal of which channel is changed, to the second signal processor,
the second signal processor starts the detection processing upon receiving the notification, and
when the deficient data is detected in the video signal of which channel is changed, the second signal processor performs one of (i) processing for discarding the deficient data detected and (ii) processing for adding dummy data to the deficient data detected to make a size of the deficient data equal to a size of an integral multiple of one packet, the integral multiple being a multiple of an integer of 1 or greater.

2. The video signal processing device according to claim 1,
wherein changing the channel causes the first signal processor to perform control to prevent multiplexing of the any video signal carried on the channel to be changed.

3. A video signal processing method that is performed by a video signal processing device that includes a first signal processor and a second signal processor, the first signal processor receiving input of a plurality of video signals, each including a plurality of packets, and multiplexing the plurality of video signals to output a multiplexed video signal via a single output system, and the second signal processor receiving input of the multiplexed video signal and demultiplexing the multiplexed video signal to output the plurality of video signals, the video signal processing method comprising:
changing, by an instruction from a user of the video signal processing device via an input receiver, a channel that carries any video signal out of the plurality of video signals and is to be used as the input of the first signal processor,
transmitting, by the first signal processor, a notification for starting detection processing for detecting deficient data whose size is less than a size of one packet with respect to the video signal of which channel is changed, to the second signal processor, the transmitting the notification being caused by changing the channel,
starting, by the second signal processor, the detection processing upon receiving the notification, and
when the deficient data is detected in the video signal of which channel is changed, performing, by the second signal processor, one of (i) processing for discarding the deficient data detected and (ii) processing for adding dummy data to the deficient data detected to make a size of the deficient data equal to a size of an integral multiple of one packet, the integral multiple being a multiple of an integer of 1 or greater.

4. A non-transitory computer-readable recording medium having recorded thereon a program for causing a computer to execute the video signal processing method according to claim 3.

5. A signal processing circuit configured to:
receive input of a plurality of video signals, each including a plurality of packets, and multiplex the plurality of video signals to output a multiplexed video signal via a single output system; and
transmit a notification for starting detection processing for detecting deficient data whose size is less than a size of one packet,
wherein the transmitting the notification is caused by changing, by an instruction from a user of the signal processing circuit via an input receiver, a channel that carries any video signal out of the plurality of video signals and is to be used as the input of the signal processing circuit, and
the detection processing is performed with respect to the video signal of which channel is changed.

6. A signal processing circuit configured to:
receive input of a multiplexed video signal obtained by multiplexing a plurality of video signals which is output via a single output system, each including a plurality of packets, and demultiplex the multiplexed video signal to output the plurality of video signals;
start detection processing for detecting deficient data whose size is less than a size of one packet, upon receiving a notification for starting the detection processing, which is caused by changing, by an instruction from a user of the signal processing circuit via an input receiver, a channel that carries any video signal out of the plurality of video signals and is to be used as the input of a circuit performing the multiplexing of the plurality of video signals, the detection processing being performed with respect to the video signal of which channel is changed; and
when the deficient data is detected in the video signal of which channel is changed, perform one of (i) processing for discarding the deficient data detected and (ii) processing for adding dummy data to the deficient data detected to make a size of the deficient data equal to a size of an integral multiple of one packet, the integral multiple being a multiple of an integer of 1 or greater.

* * * * *